United States Patent
Annam et al.

(10) Patent No.: US 10,389,457 B2
(45) Date of Patent: Aug. 20, 2019

(54) TECHNIQUES FOR EFFICIENT CONNECTED MODE MEASUREMENTS IN A NEW RADIO WIRELESS COMMUNICATION SYSTEM

(71) Applicant: QUALCOMM Incorporated, San Diego, CA (US)

(72) Inventors: Raevanth Venkat Annam, Hyderabad (IN); Chinmaya Padhy, Koraput (IN); Pankaj Gupta, Hyderabad (IN); Selvi Shah, San Diego, CA (US); Naveen Kumar Pasunooru, Hyderabad (IN); Prashanth Mohan, Chennai (IN); Parthasarathy Krishnamoorthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 15/803,360

(22) Filed: Nov. 3, 2017

(65) Prior Publication Data

US 2019/0140752 A1 May 9, 2019

(51) Int. Cl.
*H04L 12/801* (2013.01)
*H04L 12/751* (2013.01)
(Continued)

(52) U.S. Cl.
CPC ....... *H04B 17/309* (2015.01); *H04L 25/0202* (2013.01); *H04W 24/08* (2013.01);
(Continued)

(58) Field of Classification Search
CPC .... H04B 17/309; H04W 24/08; H04W 28/02; H04W 24/10; H04L 25/0202
See application file for complete search history.

(56) References Cited

U.S. PATENT DOCUMENTS 7,633,952 B2 12/2009 Ong et al.
8,842,633 B2 9/2014 Dwyer et al.
(Continued)

FOREIGN PATENT DOCUMENTS

WO WO-2015066476 A1 5/2015

*Primary Examiner* — Diane L Lo
*Assistant Examiner* — Abusayeed M Haque
(74) *Attorney, Agent, or Firm* — Arent Fox, LLP

(57) ABSTRACT

A method and apparatus for efficiently performing measurements during a connected mode in a wireless communication system is disclosed. For example, the method and apparatus may include receiving, at a user equipment (UE), a Radio Resource Control (RRC) Reconfiguration message including a plurality of measurement objects from a network entity to identify frequencies during a measurement procedure; receiving, at the UE, one or more neighbor discovery expression messages, each neighbor discovery expression message including a neighbor measurement object and being received from a respective neighbor UE; determining, by the UE, whether the plurality of measurement objects of the RRC Reconfiguration message satisfy a measurement capability threshold; selecting, by the UE, a portion of the plurality of measurement objects of the RRC Reconfiguration message; and performing, by the UE, the measurement procedure for each measurement object of the portion of the plurality of measurement objects.

28 Claims, 7 Drawing Sheets

(51) Int. Cl.
- *H04B 1/50* (2006.01)
- *H04L 1/00* (2006.01)
- *H04B 17/309* (2015.01)
- *H04W 24/10* (2009.01)
- *H04L 25/02* (2006.01)
- *H04W 24/08* (2009.01)
- *H04W 88/06* (2009.01)
- *H04W 76/27* (2018.01)

(52) U.S. Cl.
CPC ............ *H04W 24/10* (2013.01); *H04W 76/27* (2018.02); *H04W 88/06* (2013.01)

(56) References Cited

U.S. PATENT DOCUMENTS

| | | | |
|---|---|---|---|
| 9,716,993 B2 | 7/2017 | Fujishiro et al. | |
| 2008/0070575 A1* | 3/2008 | Claussen | H04W 36/24 455/436 |
| 2011/0319086 A1* | 12/2011 | Katori | H04W 48/08 455/440 |
| 2013/0308481 A1 | 11/2013 | Kazmi et al. | |
| 2014/0334320 A1* | 11/2014 | Liu | H04W 52/242 370/252 |
| 2015/0271738 A1* | 9/2015 | Cheng | H04W 16/24 455/422.1 |
| 2016/0183174 A1* | 6/2016 | Xie | H04W 48/18 455/436 |
| 2016/0198439 A1* | 7/2016 | Dalsgaard | H04L 5/0098 370/329 |
| 2017/0303265 A1* | 10/2017 | Islam | H04B 7/0639 |
| 2017/0359116 A1* | 12/2017 | Hwang | H04W 40/12 |
| 2018/0027398 A1* | 1/2018 | Jung | H04W 8/005 455/434 |
| 2018/0034515 A1* | 2/2018 | Guo | H04B 7/043 |
| 2018/0063691 A1* | 3/2018 | Shuman | H04W 4/80 |
| 2018/0376484 A1* | 12/2018 | Beale | H04L 5/0037 |

* cited by examiner

TECHNIQUES FOR EFFICIENT CONNECTED MODE MEASUREMENTS IN A NEW RADIO WIRELESS COMMUNICATION SYSTEM

BACKGROUND

Aspects of the present disclosure relate generally to wireless communication networks, and more particularly, to efficiently performing measurements during a connected mode in a wireless communication system in a new radio wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, efficiently performing frequency measurements during a connected mode in a wireless communication system is necessary. Thus, improvements in the manner or techniques used to perform such measurements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes performing measurements during a connected mode for wireless communications. The described aspects include receiving, at a user equipment (UE), a Radio Resource Control (RRC) Reconfiguration message including a plurality of measurement objects from a network entity to identify frequencies during a measurement procedure. The described aspects further include receiving, at the UE, one or more neighbor discovery expression messages, each neighbor discovery expression message including a neighbor measurement object and being received from a respective neighbor UE. The described aspects further include determining, by the UE, whether the plurality of measurement objects of the RRC Reconfiguration message satisfy a measurement capability threshold. The described aspects further include selecting, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold. The described aspects further include performing, by the UE, the measurement procedure for each measurement object of the portion of the plurality of measurement objects.

In an aspect, an apparatus for performing measurements during a connected mode for wireless communications may include a transceiver, a memory; and at least one processor coupled to the memory and configured to receive, at a UE, a RRC Reconfiguration message including a plurality of measurement objects from a network entity to identify frequencies during a measurement procedure. The described aspects further receive, at the UE, one or more neighbor discovery expression messages, each neighbor discovery expression message includes a neighbor measurement object and being received from a respective neighbor UE. The described aspects further determine, by the UE, whether the plurality of measurement objects of the RRC Reconfiguration message satisfy a measurement capability threshold. The described aspects further select, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold. The described aspects further perform, by the UE, the measurement procedure for each measurement object of the portion of the plurality of measurement objects.

In an aspect, a computer-readable medium may store computer executable code for performing measurements during a connected mode for wireless communications is described. The described aspects include code for receiving, at a UE, a RRC Reconfiguration message including a plurality of measurement objects from a network entity to identify frequencies during a measurement procedure. The described aspects further include code for receiving, at the UE, one or more neighbor discovery expression messages, each neighbor discovery expression message includes a neighbor measurement object and being received from a respective neighbor UE. The described aspects further include code for determining, by the UE, whether the plurality of measurement objects of the RRC Reconfiguration message satisfy a measurement capability threshold. The described aspects further include code for selecting, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold. The described aspects further include code for performing, by the UE, the measurement procedure for each measurement object of the portion of the plurality of measurement objects.

In an aspect, an apparatus for performing measurements during a connected mode for wireless communications is described. The described aspects include means for receiving, at a UE, a RRC Reconfiguration message including a plurality of measurement objects from a network entity to identify frequencies during a measurement procedure. The described aspects further include means for receiving, at the UE, one or more neighbor discovery expression messages, each neighbor discovery expression message includes a neighbor measurement object and being received from a respective neighbor UE. The described aspects further include means for determining, by the UE, whether the plurality of measurement objects of the RRC Reconfiguration message satisfy a measurement capability threshold. The described aspects further include means for selecting, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold. The described aspects further include means for performing, by the UE, the measurement procedure for each measurement object of the portion of the plurality of measurement objects.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
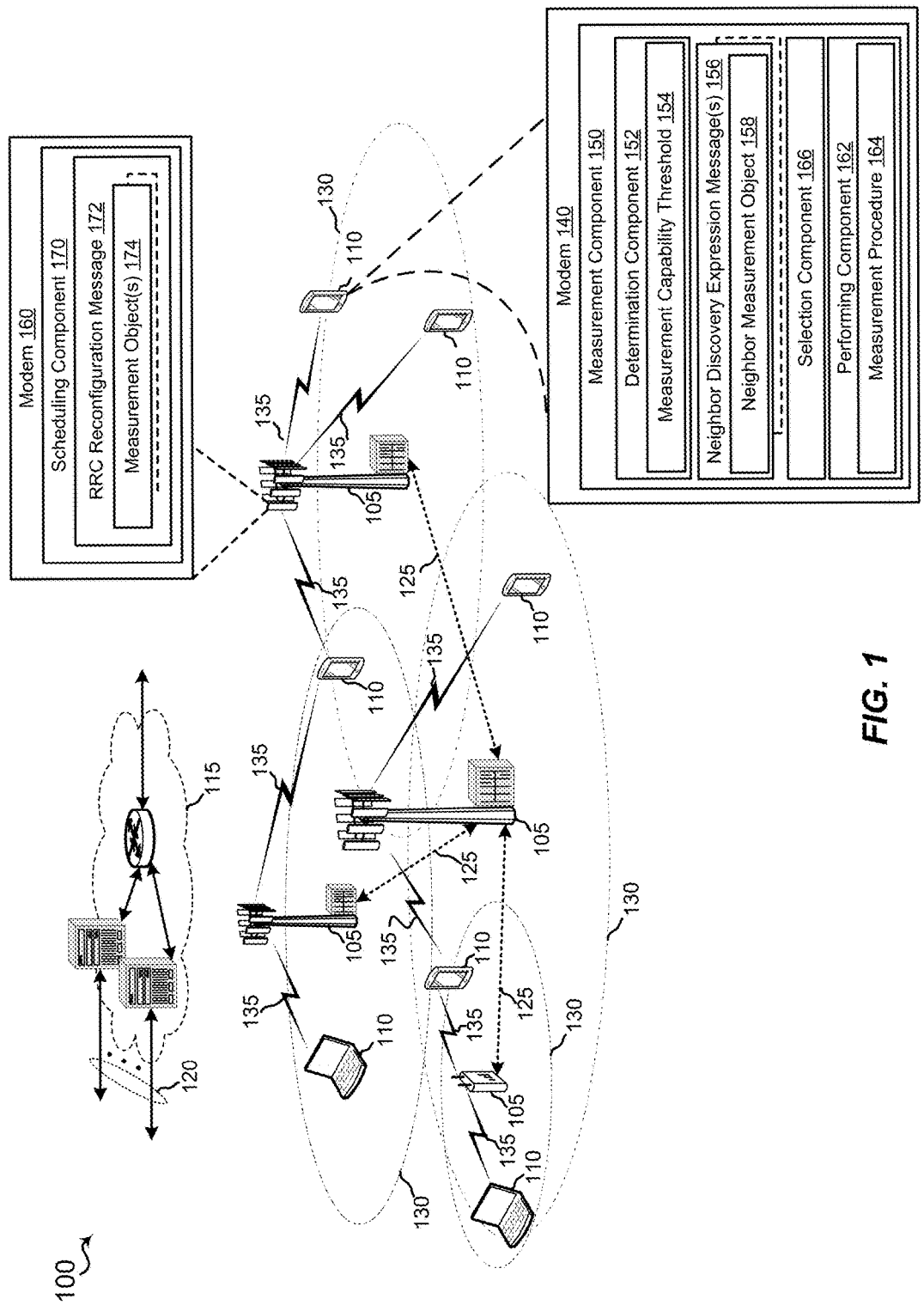
FIG. 1 is a schematic diagram of an example of a wireless communication network including at least one base station having a scheduling component configured to transmit an RRC Reconfiguration message and at least one UE having a measurement component configured to perform measurements during a connected mode.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to efficiently performing frequency measurements during a connected mode in a wireless communication system. For example, a UE has limitations on performing measurements with multiple neighbor frequencies for seamless mobility.

In some aspects, these limitations may be a potential problem considering that there is a continuous increase in the number of frequencies operators are deploying and which the UE has to measure. As such, per Release 13 Specifications, currently a UE is required to monitor the following layers: 8 Frequency Division Duplex (FDD) Evolved Universal Mobile Telecommunications System (UMTS) Terrestrial Radio Access (EUTRA) inter-frequency carriers; 8 Time Division Duplex (TDD) E-UTRA inter-frequency carriers; 6 FDD UTRA carriers (if Long Term Evolution (LTE) to UTRA FDD increased-number-of-frequencies-to-monitor (IncMon) is supported); 7 TDD UTRA carriers (if LTE to UTRA TDD IncMon is supported); and the total of at least 13 carrier frequency layers, which includes serving layer, comprising of any above defined combination of E-UTRA FDD, E-UTRA TDD, UTRA FDD, UTRA TDD, Global System for Mobile communication (GSM) (one GSM layer corresponds to 32 cells), cdma2000 1× and high rate data packet (HRPD) layers. As described herein, in an example, each layer may correspond to a different frequency.

However if a network entity schedules more frequencies (e.g., measurement objects) in the RRC Reconfiguration message, the UE may not be able to pick all of the frequencies due to the above limitations. In an example, each measurement object includes a frequency to be measured by the UE. This would result in leaving out potential neighbors during idle/connected mode measurements. Thus, currently there is no optimized procedure to pick the potential measurement objects, remove the unnecessary measurement objects and perform measurements.

Specifically, in an aspect, the present aspects may efficiently perform measurements during a connected mode in a wireless communication system. For example, the present aspects may include receiving, at a UE, a RRC Reconfiguration message including a plurality of measurement objects from a network entity to identify frequencies during a measurement procedure. The present aspects may further include receiving, at the UE, one or more neighbor discovery expression messages, each neighbor discovery expression message including a neighbor measurement object and being received from a respective neighbor UE. The present aspects may further include determining, by the UE, whether the plurality of measurement objects of the RRC Reconfiguration message satisfy a measurement capability threshold. The present aspects may further include selecting, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold. The present aspects may further include performing, by the UE, the measurement procedure for each measurement object of the portion of the plurality of measurement objects.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a measurement component 150 that efficiently performs measurements during a connected mode in a wireless communication network 100. Further, wireless communication network 100 includes at least one base station 105 with a modem 160 having a scheduling component 170 that transmits an RRC Reconfiguration message 172 on a downlink communication channel (e.g., communications link 135). Thus, according to the present disclosure, the base station 105 may transmit the RRC Reconfiguration message 172 to UE 110 to configure the UE 110 to perform the measurement procedure 164 for each measurement object 174 included in the RRC Reconfiguration message 172. However, in some instances, the RRC Reconfiguration message 172 may include too many measurement objects 174 to be measured by the UE 110. In this example, the UE 110 may be limited by a measurement capability threshold 154 corresponding to a maximum number of frequencies that the UE 110 is configured to measure. If, the UE 110 receives an RRC Reconfiguration message 172 with a plurality of measurement objects 174 that exceeds the measurement capability threshold 154, then the UE 110 will not be able to measure all of the measurement objects 174 included in the RRC Reconfiguration message 172. As such, the UE 110 and/or the measurement component 150 may need to select a portion of the measurement objects 174 in order to remove potentially unnecessary measurement objects 174 so as to efficiently perform measurements.

In an aspect, the UE 110 and/or the measurement component 150 may be configured to receive a RRC Reconfiguration message 172 including a plurality of measurement objects 174 from a base station 105 to identify frequencies during a measurement procedure 164. In an example, each of the plurality of measurement objects 174 corresponds to an Evolved Universal Mobile Telecommunications System (UMTS) Terrestrial Radio Access (EUTRA) Absolute Radio-Frequency Channel Number (EARFCN). Further, each measurement object 174 may include at least one measurement identification (measid) used to identify a measurement configuration that is linking of the measurement object 174 and a reporting configuration.

In an aspect, the UE 110 and/or the measurement component 150 may be configured to receive a neighbor discovery expression message 156 from at least one neighbor UE. For example, each neighbor discovery expression message 156 may include a neighbor measurement object 158 corresponding to a respective neighbor UE. The neighbor measurement object 158 may correspond to at least one of a EARFCN and a Physical Cell Identity (PCI). Further, in some aspects, the UE 110 and/or the measurement component 150 may be configured to transmit and/or broadcast a discovery expression message with at least one monitoring measurement object to one or more neighbor UEs. For example, the at least one monitoring measurement object may correspond to at least one of a EARFCN and a PCI.

In an aspect, the measurement component 150 may include a determination component 152, which may be configured to determine whether the plurality of measurement objects 174 of the RRC Reconfiguration message 172 satisfy a measurement capability threshold 154. For example, the UE 110 may be restricted by certain configurations (e.g., standards requirements, network capability limitations, hardware limitations, etc.), and thus cannot perform measurements for all of the plurality of measurement objects 174 of the RRC Reconfiguration message 172 if the total number of measurement objects 174 is greater than the measurement capability threshold 154. If determination component 152 determines that the plurality of measurement objects 174 of the RRC Reconfiguration message 172 satisfy the measurement capability threshold 154, then the UE 110 and/or measurement component 150 may need to select a portion of the plurality of measurement objects 174 in order to more efficiently perform measurements.

In an aspect, the measurement component 150 may include a selection component 166, which may be configured to select a portion of the plurality of measurement objects 174 of the RRC Reconfiguration message 172 based on the determination that the plurality of measurement objects 174 satisfy the measurement capability threshold 154 and the one or more neighbor discovery expression messages 156. In an example, the portion of the plurality of measurement objects 174 are less than the measurement capability threshold 154. For example, the selection of the portion of the plurality of measurement objects 174 may include the selection component 166 being configured to selecting respective measurement objects of the plurality of measurement objects 174 for each Radio Access Technology (RAT) scheduled by the base station 105.

Further, the selection component 166 may be configured to select one or more neighbor measurement objects 158 with the highest received expression power from the one or more neighbor discovery expression messages 156. For example, each neighbor measurement object 158 being received from a respective neighbor UE. In an instance, the UE 110 and/or selection component 166 may decode a received expression power for each of the plurality of neighbor measurement objects 158. Additionally, UE 110 and/or selection component 166 may determine a power ranking for each of the plurality of neighbor measurement objects 158 based on the received expression powers. As a result, the selection of the one of more neighbor measurement objects 158 may include the selection component 166 selecting the one or more neighbor measurement objects 158 with the highest received expression power according to the power ranking.

The selection component 166 may be configured to determine whether each of the one or more neighbor measurement objects 158 is included in the RRC Reconfiguration message 172. The selection component 166 may be configured to select any of the one or more neighbor measurement objects 158 to be included in the measurement procedure 164 based on a determination that the any of the one or more neighbor measurement objects 158 is included in the RRC Reconfiguration message 172 and is not presently included in the measurement procedure 164. The selection component 166 may be configured to discard any of the one or more neighbor measurement objects 158 based on a determination that the one or more neighbor measurement objects 158 is not included in the RRC Reconfiguration message 172.

Further, the selection component 166 may be configured to determine whether the respective measurement objects and the any of the one or more neighbor measurement objects 158 satisfies the measurement capability threshold 154. For example, the selection component 166 may be configured to select one or more additional measurement objects from the RRC Reconfiguration message 172 based on a measurement identification (measid) order of each remaining unselected measurement objects in the RRC Reconfiguration message 172. That is, in some instances, the selection includes the respective measurement objects, the any of the one or more neighbor measurement objects, and the one or more additional measurement objects. Moreover, the respective measurement objects, the any of the one or more neighbor measurement objects, and the one or more additional measurement objects are ordered based on an original order for each of the respective measurement objects, the any of the one or more neighbor measurement objects, and the one or more additional measurement objects. For example, the order that each measurement object 174 appeared in the RRC Reconfiguration message 172 in relation to other measurement objects 174 in the RRC Reconfiguration message 172 is the order in which the measurement object 174 will appear once selected and the order in which they will measurement procedure 164. In other instances, the selection includes the respective measurement objects and the any of the one or more neighbor measurement objects. Additionally, in other instances, the selection includes the respective measurement objects and the one or more additional measurement objects.

In an aspect, the measurement component 150 may include a performing component 162, which may be configured to perform the measurement procedure 164 for each measurement object 174 of the portion of the plurality of measurement objects 174. For example, the selection component 166 may transmit at least one or more of the respective measurement objects, the any of the one or more neighbor measurement objects, and the one or more additional measurement objects to Management Layer 1 (ML1) for performing the measurement procedure 164. In some aspects, the performing component 162 may be configured to operate in ML1. Moreover, the performing component 162 may be configured to perform the measurement procedure 164 for at least one or more of the respective measurement objects, the any of the one or more neighbor measurement objects, and the one or more additional measurement objects.

In another aspect, the measurement component 150 may include a performing component 162, which may be configured to perform the measurement procedure 164 for each measurement object 174 of the plurality of measurement objects 174 based on a determination that the plurality of measurement objects 176 fails to satisfy the measurement capability threshold 154. For example, if the total number of measurement objects 174 is less than the measurement capability threshold 154 then performing component 162 may forgo the selection of the portion of the plurality of measurement objects 174, and perform the measurement procedure 164 for each measurement object 174 of the RRC Reconfiguration message 172.

In an aspect, as a result of performing the measurement procedure 164, the UE 110 may be configured to perform at least one of a handover procedure or a cell reselection procedure based on results of the measurement procedure 164. As a result, the UE 110 is able to have a better handover success ratio, engage in faster and more seamless mobility due to the modification of the measurement objects 174, and eliminate measurement attempts on unnecessary cells (e.g., ghost cells).

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuL-TEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
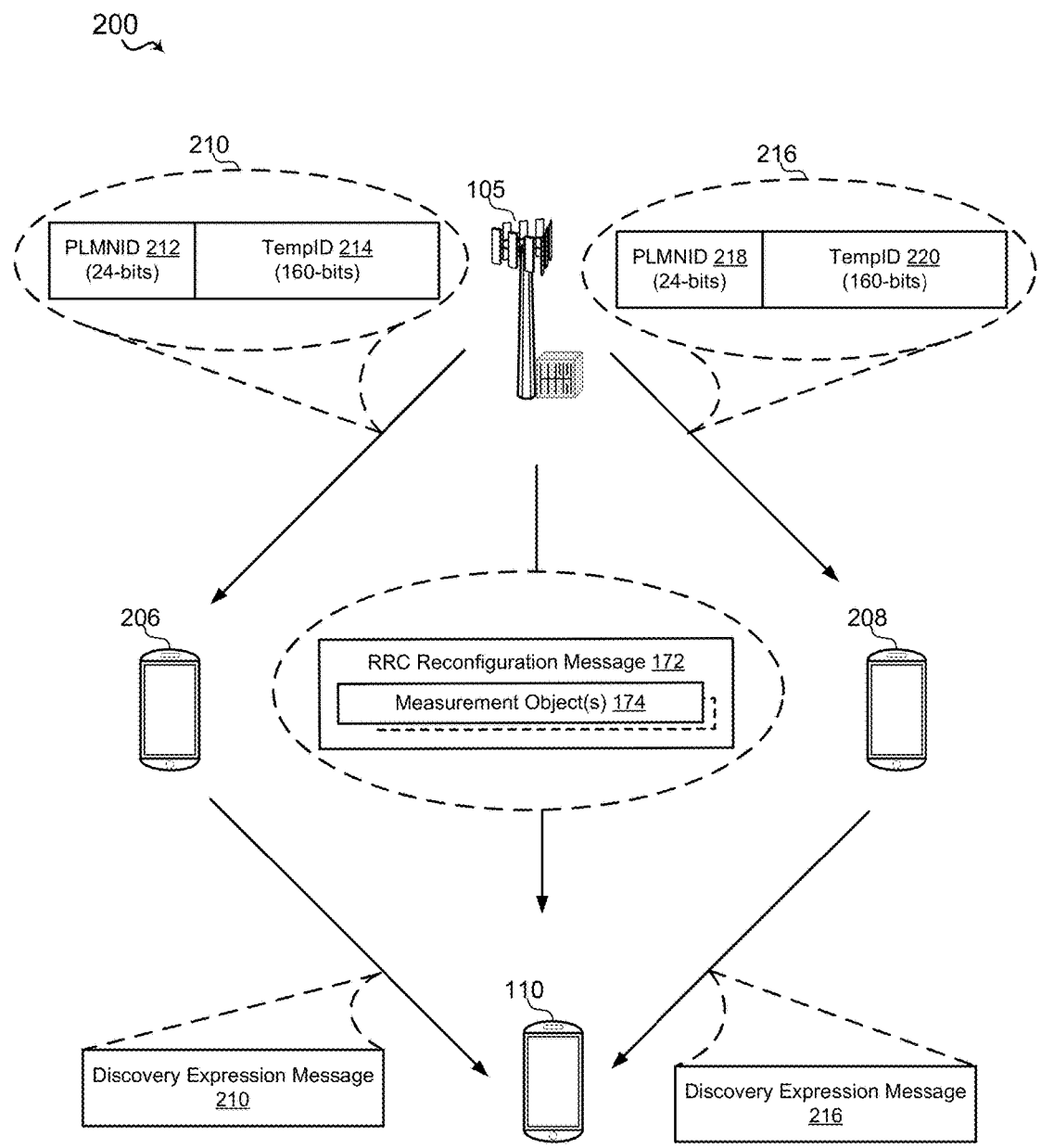
FIG. 2 is a conceptual diagram of an example receiving neighbor discovery expression messages from neighbor UEs in order to efficiently perform measurements during a connected mode in a wireless communication system.

FIG. 2 depicts a conceptual diagram of an example wireless communications procedure 200 for receiving neighbor discovery expression messages from neighbor UEs in order to efficiently perform measurements between a plurality of UEs and a base station. For example, a monitoring UE and the base station may correspond to the UE 110 and the base station 105, respectively, located in wireless communication network 100 as shown in FIG. 1. Further, UEs 206 and 208 may correspond to neighbor announcing UEs 206 and 208. The monitoring UE 110 may include a modem 140 having a measurement component 150 that performs measurements during a connected mode in a wireless communication network 100. Further, the base station 105 may correspond to an LTE-D server and may include a modem 160 having a scheduling component 170 that enables transmission of an RRC Reconfiguration message 172 and one or more discovery expression messages on a downlink communication channel (e.g., communications link 135) to one or more UEs.

In an aspect, the base station 105 and/or scheduling component 170 may transmit RRC Reconfiguration message 172 to UE 110 to configure the monitoring UE 110 to perform the measurement procedure 164 for each measurement object 174 included in the RRC Reconfiguration message 172. As described herein, the measurement objects 174 may correspond to EARFCNs. Further, the monitoring UE 110 may receive a discovery filter from base station 105 for monitoring EARFCNs included in the RRC Reconfiguration message 172.

In an aspect, the neighboring UEs, such as announcing UEs 206 and 208 may each receive a discovery expression message, such as discovery expression messages 210 and 216, respectively, from base station 105. For example, the discovery expression messages 210 and 216 may correspond to a PAC code for each announcing UE's own EARFCN-PCI pair. In an example, the PAC code is an 184 bit short code as part of the MAC PDU (PC5 discovery message) that is transmitted and/or received over the PC5 interface by UEs. In this example, the discovery expression message 210 may include a PLMNID 212 that is 24 bits in length and a TempID 214 that is 160 bits in length. Similarly, the discovery expression message 216 may include a PLMNID 218 that is 24 bits in length and a TempID 220 that is 160 bits in length. Each of the discovery expression messages 210 and 216 may include a validity time after which each of the discovery expression messages 210 and 216 need to be refreshed by announcing UEs 206 and 208, respectively. In an example, the base station 105 may maintain a mapping table of:

| Announcing UE PA-ID (EARFCN-PCI) | Monitoring UE PA-ID (EARFCN) | PAC Code/Discovery Filter |
|---|---|---|
| 40620-397 | 40620 | 184 bit PAC CODE 1 |
| 39150-200 | 39150 | 184 bit PAC CODE 2 |
| 300-1 | 300 | 184 bit PAC CODE 3 |

In an aspect, the announcing UEs 206 and 208 may each broadcast and/or retransmit discovery expression messages 210 and 216, respectively, to the monitoring UE 110. For example, the monitoring UE 110 may determine whether a match between each of the discovery expression messages 210 and 216 and the discovery filter exists. If a match exists (e.g., the EARFCNs match) then the monitoring UE 110 may select the matched EARFCN of the respective discovery expression message for a potential neighbor-list table. The monitoring UE 110 may use the potential neighbor-list table for subsequent selection of a portion of the plurality of measurement objects 174 received from the base station 105 in order to more efficiently perform the measurement procedure 164.

Figure 3:
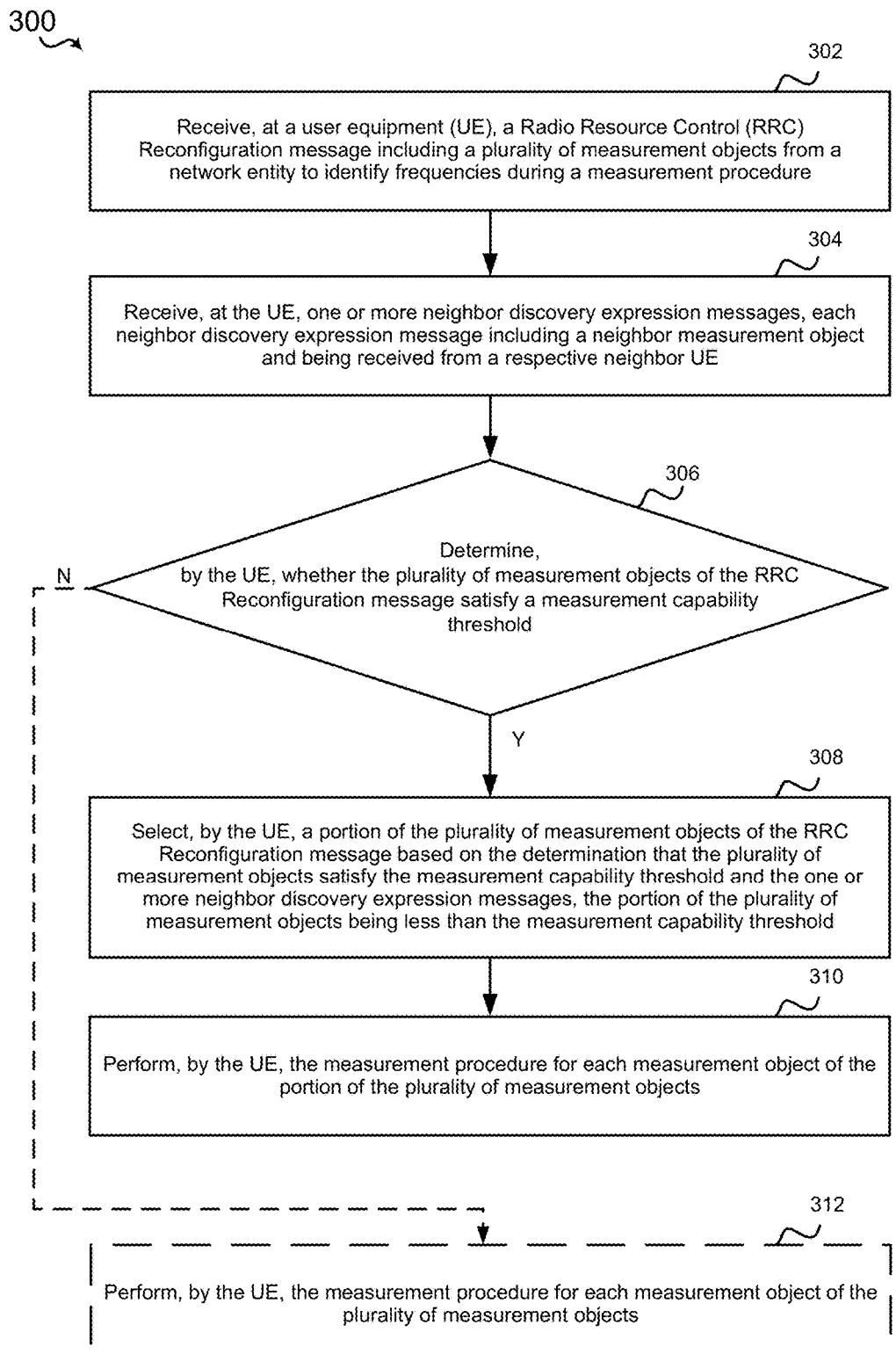
FIG. 3 is a flow diagram of an example of a method of performing measurements during a connected mode in a wireless communication system.

Referring to FIG. 3, for example, a method 300 of wireless communication in operating UE 110 according to the above-described aspects to perform measurements during a connected mode in a wireless communication system includes one or more of the herein-defined actions. The blocks illustrated as having dashed lines may be optional.

At block 302, the method 300 may receive, at a UE, a RRC Reconfiguration message including a plurality of measurement objects from a network entity to identify frequencies during a measurement procedure. For example, the UE 110 and/or measurement component 150 may execute a transceiver 502 (FIG. 5) to receive a RRC Reconfiguration message 172 including a plurality of measurement objects 174 from a base station 105 to identify frequencies during a measurement procedure 164.

At block 304, the method 300 may receive, at the UE, one or more neighbor discovery expression messages, each neighbor discovery expression message including a neighbor measurement object and being received from a respective neighbor UE. For example, the UE 110 and/or measurement component 150 may execute a transceiver 502 (FIG. 5) to receive one or more neighbor discovery expression messages 156, each neighbor discovery expression message 156 includes a neighbor measurement object 158 and being received from a respective neighbor UE.

At block 306, the method 300 may determine, by the UE, whether the plurality of measurement objects of the RRC Reconfiguration message satisfy a measurement capability threshold. For example, the UE 110 and/or measurement component 150 may execute the determination component 152 to determine whether the plurality of measurement objects 174 of the RRC Reconfiguration message 172 satisfy a measurement capability threshold 154.

At block 308, the method 300 may select, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold. For example, the UE 110 and/or measurement component 150 may execute the selection component 166 to select a portion of the plurality of measurement objects 174 of the RRC Reconfiguration message 172 based on the determination that the plurality of measurement objects 174 satisfy the measurement capability threshold 154 and the one or more neighbor discovery expression messages 156, the portion of the plurality of measurement objects 174 being less than the measurement capability threshold 154.

At block 310, the method 300 may perform, by the UE, the measurement procedure for each measurement object of the portion of the plurality of measurement objects. For example, the UE 110 and/or measurement component 150 may execute the performing component 162 to perform the measurement procedure 164 for each measurement object 174 of the portion of the plurality of measurement objects 174.

At block 312, the method 300 may optionally perform, by the UE, the measurement procedure for each measurement object of the plurality of measurement objects based on the determination that the plurality of measurement objects fails to satisfy the measurement capability threshold. For example, the UE 110 and/or measurement component 150 may execute the performing component 162 to perform the measurement procedure 164 for each measurement object 174 of the plurality of measurement objects 174 based on the determination that the plurality of measurement objects 174 fails to satisfy the measurement capability threshold 154.

Figure 4A:
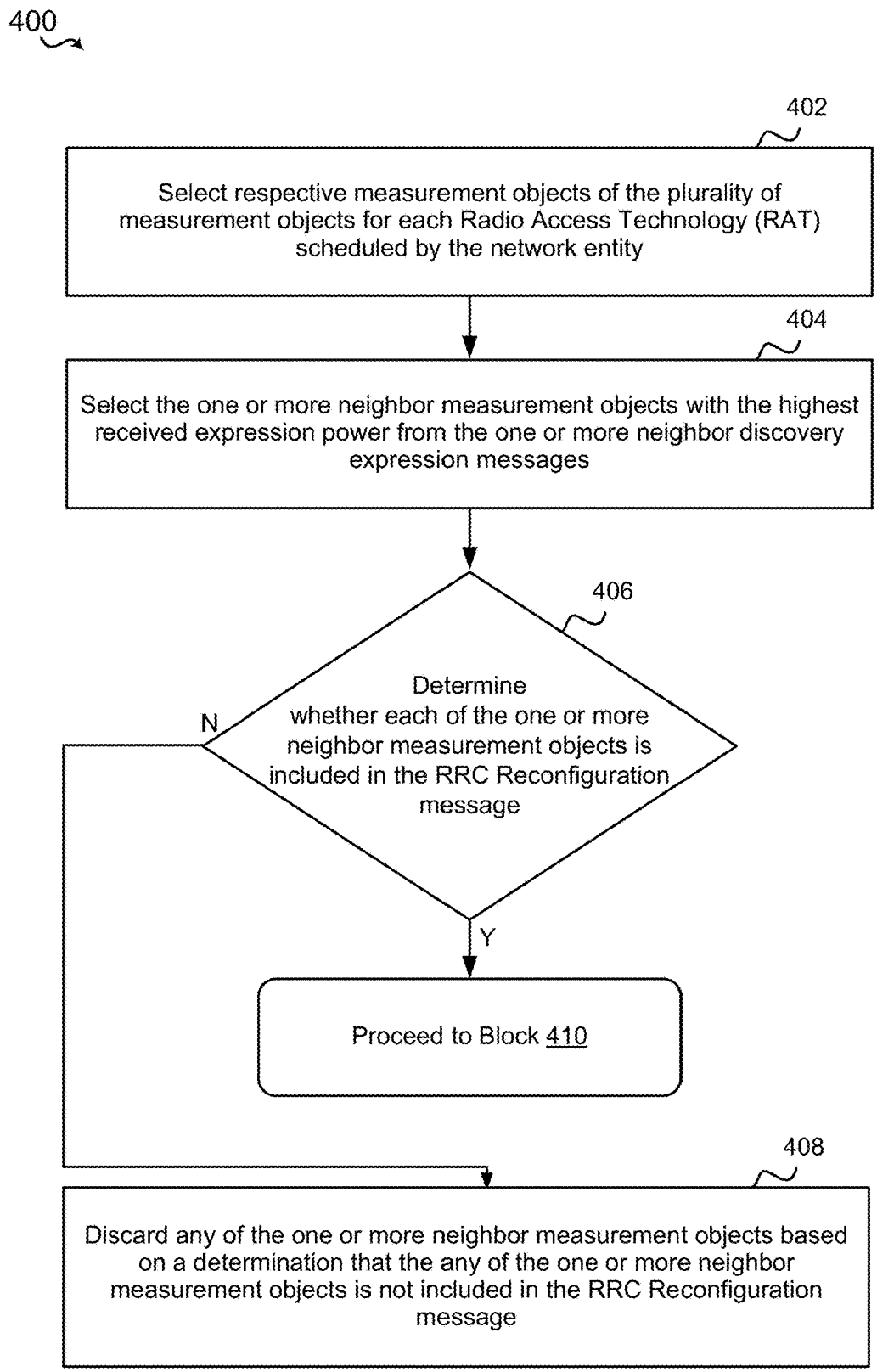
FIGS. 4A and 4B are flow diagrams of example of methods of selecting a portion of the plurality of measurement objects of the RRC Reconfiguration message in order to efficiently perform measurements during a connected mode in a wireless communication system.
Figure 4B:
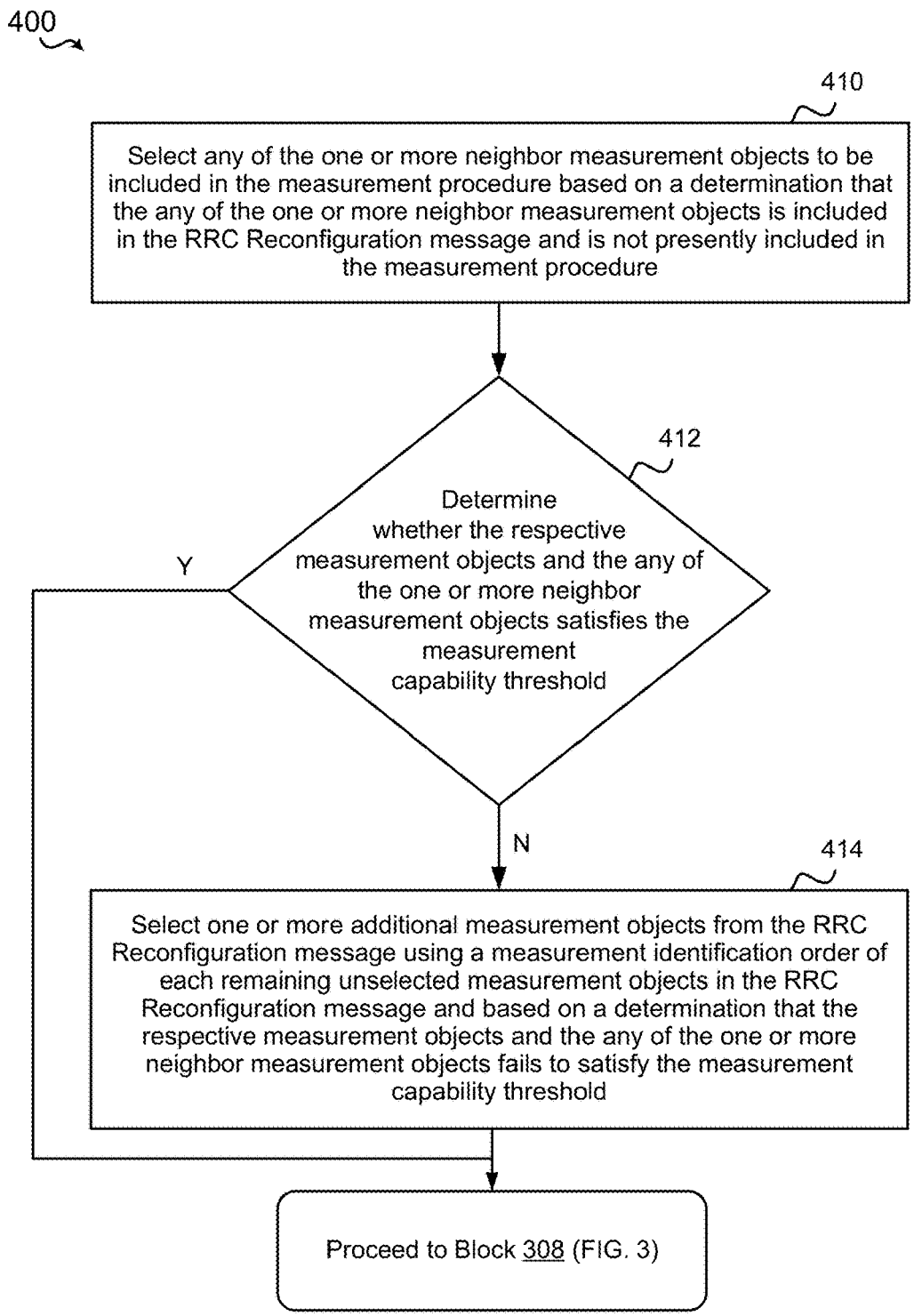

Referring to FIGS. 4A and 4B, for example, a method 400 of wireless communication in operating UE 110 according to the above-described aspects to selecting a portion of the plurality of measurement objects of the RRC Reconfiguration message in order to efficiently perform measurements during a connected mode in a wireless communication system includes one or more of the herein-defined actions. The blocks illustrated as having dashed lines may be optional.

At block 402, the method 400 may select respective measurement objects of the plurality of measurement for each RAT scheduled by the network entity. For example, in an aspect, the UE 110 and/or measurement component 150 may execute the selection component 166 to select respective measurement objects of the plurality of measurement objects 174 for each RAT scheduled by the base station 105.

At block 404, the method 400 may select the one or more neighbor measurement objects with the highest received expression power. For example, in an aspect, the UE 110 and/or measurement component 150 may execute the selection component 166 to select the one or more neighbor measurement objects 158 with the highest received expression power from the one or more neighbor discovery expression messages 156.

At block 406, the method 400 may determine whether each of the one or more neighbor measurement objects is included in the RRC Reconfiguration message. For example, in an aspect, the UE 110 and/or measurement component 150 may execute the selection component 166 to determine whether each of the one or more neighbor measurement objects 158 is included in the RRC Reconfiguration message 172.

At block 408, the method 400 may discard any of the one or more neighbor measurement objects based on a determination that the any of the one or more neighbor measurement objects is not included in the RRC Reconfiguration message. For example, in an aspect, the UE 110 and/or measurement component 150 may execute the selection component 166 to discard any of the one or more neighbor measurement objects based on a determination that the any of the one or more neighbor measurement objects is not included in the RRC Reconfiguration message 172.

At block 410, the method 400 may select any of the one or more neighbor measurement objects to be included in the measurement procedure based on a determination that the any of the one or more neighbor measurement objects is included in the RRC Reconfiguration message and is not presently included in the measurement procedure. For example, in an aspect, the UE 110 and/or measurement component 150 may execute the selection component 166 to select any of the one or more neighbor measurement objects 158 to be included in the measurement procedure 164 based on a determination that the any of the one or more neighbor measurement objects 158 is included in the RRC Reconfiguration message 172 and is not presently included in the measurement procedure 164.

At block 412, the method 400 may determine whether the respective measurement objects and the any of the one or more neighbor measurement objects satisfies the measurement capability threshold. For example, in an aspect, the UE 110 and/or measurement component 150 may execute the selection component 166 to determine whether the respective measurement objects and the any of the one or more neighbor measurement objects 158 satisfies the measurement capability threshold 154. If, at block 412, selection component 166 determines that the respective measurement objects and the any of the one or more neighbor measurement objects satisfies the measurement capability threshold 154, then the selection includes the respective measurement objects and the any of the one or more neighbor measurement objects 158. Method 400 may then proceed to block 308 of the method 300 (FIG. 3).

At block 414, the method 400 may select one or more additional measurement objects from the RRC Reconfiguration message using a measurement identification order of each remaining unselected measurement objects in the RRC Reconfiguration message and based on a determination that the respective measurement objects and the any of the one or more neighbor measurement objects fails to satisfy the measurement capability threshold. For example, in an aspect, the UE 110 and/or measurement component 150 may execute the selection component 166 to select one or more additional measurement objects from the RRC Reconfiguration message 172 using a measurement identification order of each remaining unselected measurement objects in the RRC Reconfiguration message 172 and based on a determination that the respective measurement objects and the any of the one or more neighbor measurement objects fails to satisfy the measurement capability threshold 154. As a result, the selection includes the respective measurement objects, the any of the one or more neighbor measurement objects, and the one or more additional measurement objects. Method 400 may then proceed to block 308 of the method 300 (FIG. 3).

Figure 5:
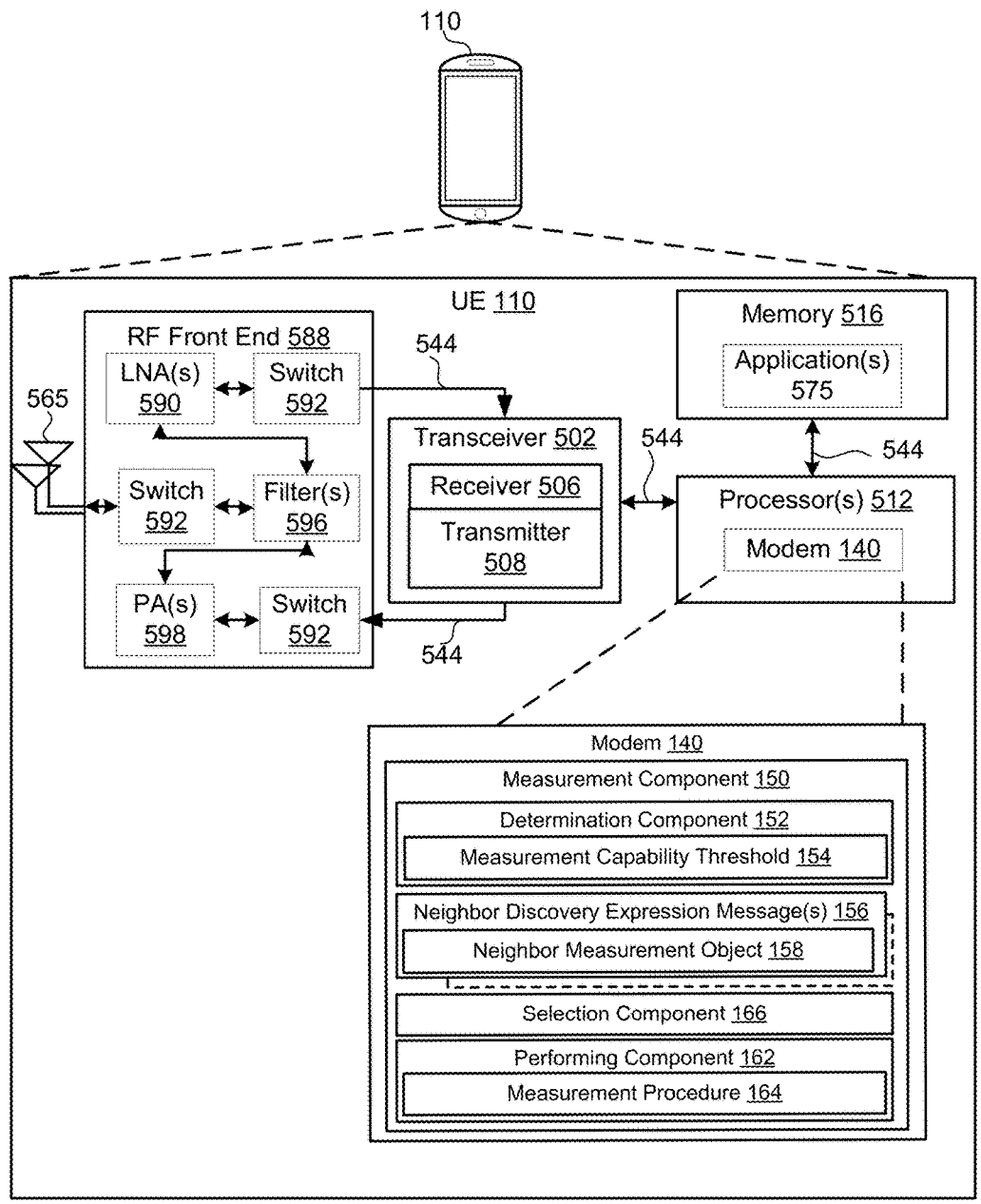
FIG. 5 is a schematic diagram of example components of the UE of FIG. 1.

Referring to FIG. 5, one example of an implementation of an UE 110 may include a variety of components, some of which have already been described above, but including components such as one or more processors 512 and memory 516 and transceiver 502 in communication via one or more buses 544, which may operate in conjunction with modem 140 and measurement component 150 to enable one or more of the functions described herein related to performing measurements during a connected mode in a wireless communication system. Further, the one or more processors 512, modem 514, memory 516, transceiver 502, radio frequency (RF) front end 588 and one or more antennas 565, may be configured to support voice and/or data calls (simultaneously or non-simultaneously) in one or more radio access technologies. In some aspects, the modem 140 may be the same as or similar to the modem 140 (FIG. 1).

In an aspect, the one or more processors 512 can include a modem 140 that uses one or more modem processors. The various functions related to measurement component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with the transceiver 502. In other aspects, some of the features of the one or more processors 512 and/or modem 140 associated with measurement component 150 may be performed by transceiver 502.

Also, memory 516 may be configured to store data used herein and/or local versions of applications 575 or measurement component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining measurement component 150 and/or one or more of its subcomponents, and/or data associated therewith, when UE 110 is operating at least one processor 512 to execute measurement component 150 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a RF receiver. In an aspect, the receiver 506 may receive signals transmitted by at least one base station 105. Additionally, the receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may include, but is not limited to, an RF transmitter.

Moreover, in an aspect, the UE 110 may include an RF front end 588, which may operate in communication with one or more antennas 565 and transceiver 502 for receiving and transmitting radio transmissions, for example, wireless communications transmitted by at least one base station 105, wireless transmissions received from neighbor UEs 206 and/or 208, or wireless transmissions transmitted by the UE 110. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and a corresponding specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by transceiver 502 and/or processor 512.

As such, the transceiver 502 may be configured to transmit and receive wireless signals through one or more antennas 565 via RF front end 588. In an aspect, the transceiver 502 may be tuned to operate at specified frequencies such that the UE 110 can communicate with, for example, one or more base stations 105 or one or more cells associated with one or more base stations 105. In an aspect, for example, the modem 140 can configure the transceiver 502 to operate at a specified frequency and power level based on the UE configuration of the UE 110 and the communication protocol used by the modem 140.

In an aspect, modem 140 can be a multiband-multimode modem, which can process digital data and communicate with the transceiver 502 such that the digital data is sent and received using the transceiver 502. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 6:
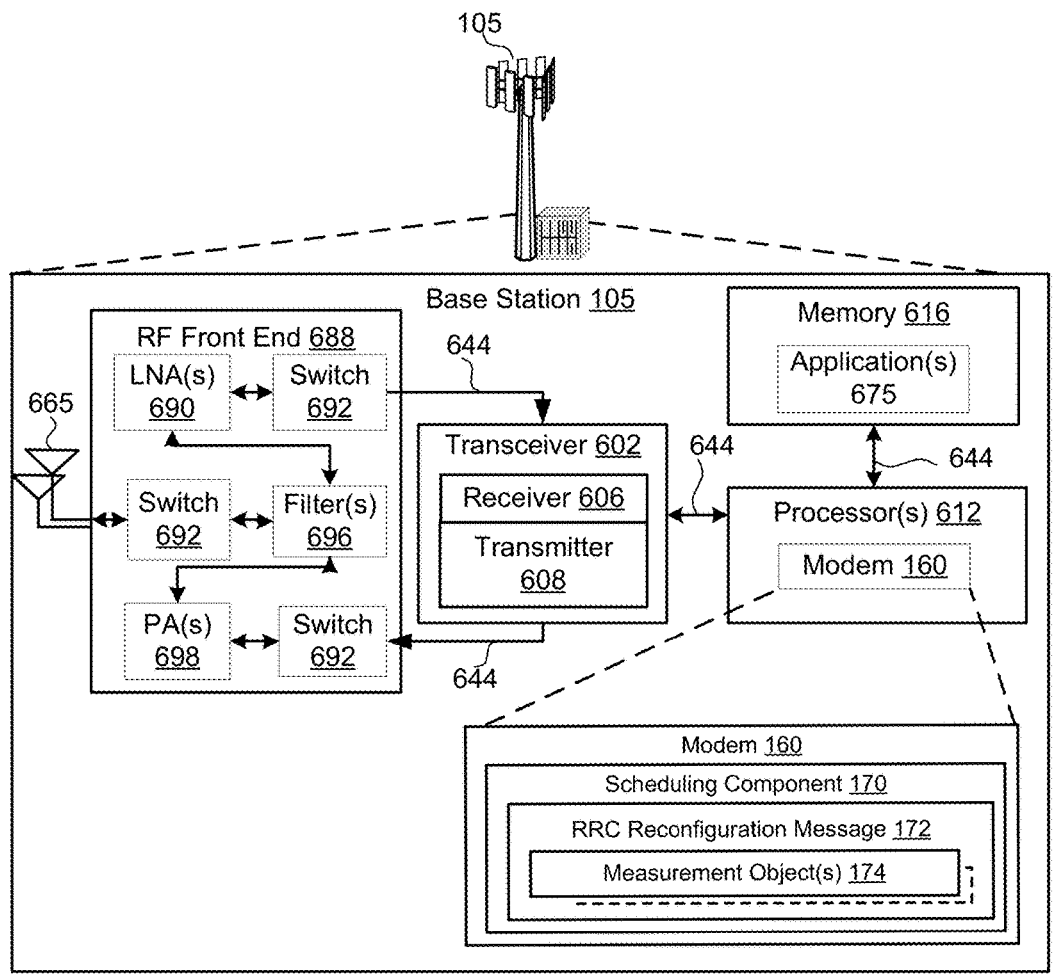
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and scheduling component 170 configured to transmit an RRC Reconfiguration messages 172.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
receiving, at a user equipment (UE), a Radio Resource Control (RRC) Reconfiguration message including a plurality of measurement objects from a network entity to identify frequencies during a measurement procedure;
receiving, at the UE, one or more neighbor discovery expression messages, each neighbor discovery expression message including a neighbor measurement object and being received from a respective neighbor UE, wherein the neighbor discovery expression message corresponds to a (Porting Authorizing Code) PAC code and includes a Public Land Mobile Network Identifier (PLMNID) and a Temporary Identifier (TempID);
determining, by the UE, whether the plurality of measurement objects of the RRC Reconfiguration message satisfy a measurement capability threshold;
selecting, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold; and
performing, by the UE, the measurement procedure for each measurement object of the portion of the plurality of measurement objects.

2. The method of claim 1, wherein selecting, by the UE, the portion of the plurality of measurement objects of the RRC Reconfiguration message based on the determination that the plurality of measurement objects satisfy the measurement capability threshold and the one or more neighbor discovery expression messages further comprises:
selecting respective measurement objects of the plurality of measurement objects for each Radio Access Technology (RAT) scheduled by the network entity;
selecting one or more neighbor measurement objects with the highest received expression power from the one or more neighbor discovery expression messages;
determining whether each of the one or more neighbor measurement objects is included in the RRC Reconfiguration message;
selecting any of the one or more neighbor measurement objects to be included in the measurement procedure based on a determination that the any of the one or more neighbor measurement objects is included in the RRC Reconfiguration message and is not presently included in the measurement procedure;
determining whether the respective measurement objects and the any of the one or more neighbor measurement objects satisfies the measurement capability threshold; and
selecting one or more additional measurement objects from the RRC Reconfiguration message using a measurement identification order of each remaining unselected measurement objects in the RRC Reconfiguration message and based on a determination that the respective measurement objects and the any of the one or more neighbor measurement objects fails to satisfy the measurement capability threshold.

3. The method of claim 2, further comprising discarding any of the one or more neighbor measurement objects based on a determination that the any of the one or more neighbor measurement objects is not included in the RRC Reconfiguration message.

4. The method of claim 2, further comprising:
decoding a received expression power for each of the one or more neighbor measurement objects; and
determining a power ranking for each of the one or more neighbor measurement objects based on the received expression powers,
wherein selecting the one or more neighbor measurement objects with the highest received expression power from the one or more neighbor measurement objects further comprises selecting the one or more neighbor measurement objects with the highest received expression power according to the power ranking.

5. The method of claim 2, further comprising transmitting the respective measurement objects, the any of the one or more neighbor measurement objects, and the one or more additional measurement objects to Management Layer 1 (ML1) for performing the measurement procedure.

6. The method of claim 2, wherein the measurement procedure includes the respective measurement objects, the any of the one or more neighbor measurement objects, and the one or more additional measurement objects.

7. The method of claim 6, wherein the respective measurement objects, the any of the one or more neighbor measurement objects, and the one or more additional measurement objects are ordered in the measurement procedure based on an original order for each of the respective measurement objects, the any of the one or more neighbor measurement objects, and the one or more additional measurement objects in the RRC Reconfiguration message.

8. The method of claim 1, wherein the neighbor measurement object corresponds to at least one of a Evolved Universal Mobile Telecommunications System (UMTS) Terrestrial Radio Access (EUTRA) Absolute Radio-Frequency Channel Number (EARFCN) and a Physical Cell Identity (PCI).

9. The method of claim 1, further comprising broadcasting, by the UE, a discovery expression message with at least one monitoring measurement object to one or more neighbor UEs.

10. The method of claim 9, wherein the at least one monitoring measurement object corresponds to at least one of a Evolved Universal Mobile Telecommunications System (UMTS) Terrestrial Radio Access (EUTRA) Absolute Radio-Frequency Channel Number (EARFCN) and a Physical Cell Identity (PCI).

11. The method of claim 1, where each of the plurality of measurement objects corresponds to an Evolved Universal Mobile Telecommunications System (UMTS) Terrestrial Radio Access (EUTRA) Absolute Radio-Frequency Channel Number (EARFCN).

12. The method of claim 1, further comprising performing, by the UE, the measurement procedure for each measurement object of the plurality of measurement objects based on the determination that the plurality of measurement objects fail to satisfy the measurement capability threshold.

13. The method of claim 1, further comprising performing at least one of a handover procedure or a cell reselection procedure based on results of the measurement procedure.

14. An apparatus for wireless communications, comprising:

a memory; and a processor in communication with the memory, wherein the processor is configured to:

receive, at a user equipment (UE), a Radio Resource Control (RRC) Reconfiguration message including a plurality of measurement objects from a network entity to identify frequencies during a measurement procedure;

receive, at the UE, one or more neighbor discovery expression messages, each neighbor discovery expression message including a neighbor measurement object and being received from a respective neighbor UE, wherein the neighbor discovery expression message corresponds to a (Porting Authorizing Code) PAC code and includes a Public Land Mobile Network Identifier (PLMNID) and a Temporary Identifier (TempID);

determine, by the UE, whether the plurality of measurement objects of the RRC Reconfiguration message satisfy a measurement capability threshold;

modify, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold; and perform, by the UE, the measurement procedure for each measurement object of the portion of the plurality of measurement objects.

15. The apparatus of claim 14, wherein the processor configured to select, by the UE, the portion of the plurality of measurement objects of the RRC Reconfiguration message based on the determination that the plurality of measurement objects satisfy the measurement capability threshold and the one or more neighbor discovery expression messages is further configured to:

select respective measurement objects of the plurality of measurement objects from the measurement list for each Radio Access Technology (RAT) scheduled by the network entity;

select one or more neighbor measurement objects with the highest received expression power from the one or more neighbor discovery expression messages;

determine whether each of the one or more neighbor measurement objects is included in the RRC Reconfiguration message;

select any of the one or more neighbor measurement objects to be included in the measurement procedure based on a determination that the any of the one or more neighbor measurement objects is included in the RRC Reconfiguration message and is not presently included in the measurement procedure;

determine whether the respective measurement objects and the any of the one or more neighbor measurement objects satisfies the measurement capability threshold; and select one or more additional measurement objects from the RRC Reconfiguration message using a measurement identification order of each remaining unselected measurement objects in the RRC Reconfiguration message and based on a determination that the respective measurement objects and the any of the one or more neighbor measurement objects fails to satisfy the measurement capability threshold.

16. The apparatus of claim 15, wherein the processor is further configured to discard any of the one or more neighbor measurement objects based on a determination that the any of the one or more neighbor measurement objects is not included in the RRC Reconfiguration message.

17. The apparatus of claim 15, wherein the processor is further configured to:

decode a received expression power for each of the one or more neighbor measurement objects;

determine a power ranking for each of the one or more neighbor measurement objects based on the received expression powers; and wherein the processor configure to select the one or more neighbor measurement objects with the highest received expression power from the one or more neighbor measurement objects is further configured to select the one or more neighbor measurement objects with the highest received expression power according to the power ranking.

18. The apparatus of claim 15, wherein the processor is further configured to transmit the respective measurement objects, the any of the one or more neighbor measurement objects, and the one or more additional measurement objects to Management Layer 1 (ML1) for performing the measurement procedure.

19. The apparatus of claim 15, wherein the measurement procedure includes the respective measurement objects, the any of the one or more neighbor measurement objects, and the one or more additional measurement objects.

20. The apparatus of claim 19, wherein the respective measurement objects, the any of the one or more neighbor measurement objects, and the one or more additional measurement objects are ordered in the measurement procedure based on an original order for each of the respective measurement objects, the any of the one or more neighbor measurement objects, and the one or more additional measurement objects in the RRC Reconfiguration message.

21. The apparatus of claim 14, wherein the neighbor measurement object corresponds to at least one of a Evolved Universal Mobile Telecommunications System (UMTS) Terrestrial Radio Access (EUTRA) Absolute Radio-Frequency Channel Number (EARFCN) and a Physical Cell Identity (PCI).

22. The apparatus of claim 14, wherein the processor is further configured to broadcast, by the UE, a discovery expression message with at least one monitoring measurement object to one or more neighbor UEs.

23. The apparatus of claim 22, wherein the at least one monitoring measurement object corresponds to at least one of a Evolved Universal Mobile Telecommunications System (UMTS) Terrestrial Radio Access (EUTRA) Absolute Radio-Frequency Channel Number (EARFCN) and a Physical Cell Identity (PCI).

24. The apparatus of claim 14, where each of the plurality of measurement objects corresponds to an Evolved Universal Mobile Telecommunications System (UMTS) Terrestrial Radio Access (EUTRA) Absolute Radio-Frequency Channel Number (EARFCN).

25. The apparatus of claim 14, wherein the processor is further configured to perform, by the UE, the measurement procedure for each measurement object of the plurality of measurement objects based on the determination that the plurality of measurement objects fail to satisfy the measurement capability threshold.

26. The apparatus of claim 14, wherein the processor is further configured to perform at least one of a handover procedure or a cell reselection procedure based on results of the measurement procedure.

27. An apparatus for wireless communications, comprising:
- means for receiving, at a user equipment (UE), a Radio Resource Control (RRC) Reconfiguration message including a plurality of measurement objects from a network entity to identify frequencies during a measurement procedure;
- means for receiving, at the UE, one or more neighbor discovery expression messages, each neighbor discovery expression message including a neighbor measurement object and being received from a respective neighbor UE, wherein the neighbor discovery expression message corresponds to a (Porting Authorizing Code) PAC code and includes a Public Land Mobile Network Identifier (PLMNID) and a Temporary Identifier (TempID);
- means for determining, by the UE, whether the plurality of measurement objects of the RRC Reconfiguration message satisfy a measurement capability threshold;
- means for selecting, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold; and
- means for performing, by the UE, the measurement procedure for each measurement object of the portion of the plurality of measurement objects.

28. A non-transitory computer-readable medium storing computer code executable by a processor for wireless communications, comprising:
- code for receiving, at a user equipment (UE), a Radio Resource Control (RRC) Reconfiguration message including a plurality of measurement objects from a network entity to identify frequencies during a measurement procedure;
- code for receiving, at the UE, one or more neighbor discovery expression messages, each neighbor discovery expression message including a neighbor measurement object and being received from a respective neighbor UE, wherein the neighbor discovery expression message corresponds to a (Porting Authorizing Code) PAC code and includes a Public Land Mobile Network Identifier (PLMNID) and a Temporary Identifier (TempID);
- code for determining, by the UE, whether the plurality of measurement objects of the RRC Reconfiguration message satisfy a measurement capability threshold;
- code for selecting, by the UE, a portion of the plurality of measurement objects of the RRC Reconfiguration message based on the determination that the plurality of measurement objects satisfy the measurement capability threshold and the one or more neighbor discovery expression messages, the portion of the plurality of measurement objects being less than the measurement capability threshold; and
- code for performing, by the UE, the measurement procedure for each measurement object of the portion of the plurality of measurement objects.

* * * * *